Figure 2:
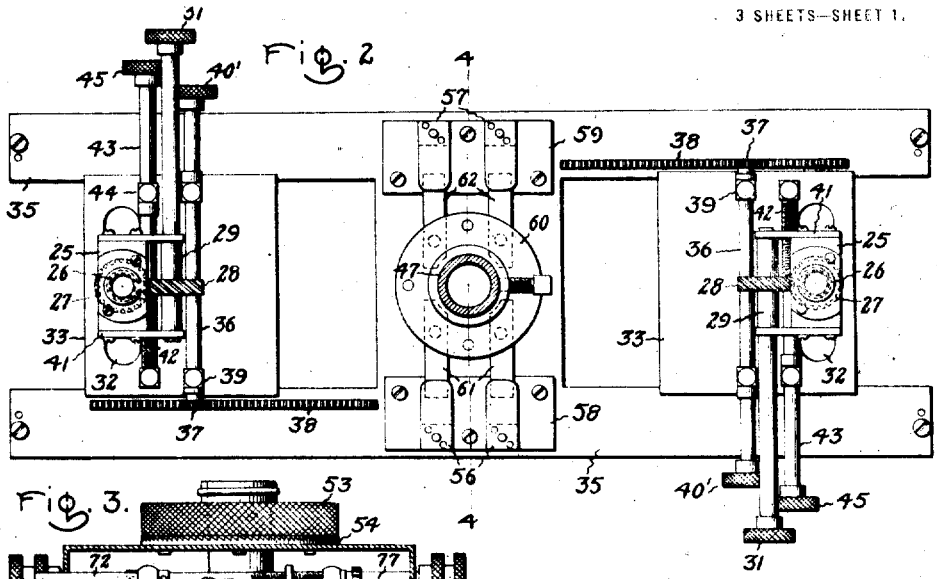

S. E. DOANE, R. P. BURROWS AND A. F. SINCLAIR.

ILLUMINATING DEVICE FOR PROJECTING PURPOSES.

Reissued Feb. 17, 1920. APPLICATION FILED JAN. 21, 19

APPLICATION FILED OCT. 25, 1919.

14,805.

3 SHEETS—SHEET 1.

INVENTORS:
SAMUEL E. DOANE,
ROBERT P. BURROWS,
ARCHIBALD F. SINCLAIR,
BY Albert G. Davis
THEIR ATTORNEY.

S. E. DOANE, R. P. BURROWS AND A. F. SINCLAIR.

ILLUMINATING DEVICE FOR PROJECTING PURPOSES.

Reissued Feb. 17, 1920. APPLICATION FILED JAN. 21, 1916. 14,805.

1,315,821. APPLICATION FILED OCT. 25, 1919. Patented Sept. 9, 1919.

3 SHEETS-SHEET 3.

INVENTORS:
SAMUEL E. DOANE,
ROBERT P. BURROWS,
ARCHIBALD F. SINCLAIR,
BY Albert G. Davis
THEIR ATTORNEY.

S. E. DOANE, R. P. BURROWS AND A. F. SINCLAIR.

ILLUMINATING DEVICE FOR PROJECTING PURPOSES.

Reissued Feb. 17. 1920.

APPLICATION FILED OCT. 25, 1919.

14,805.

3 SHEETS—SHEET 3.

INVENTORS:
SAMUEL E. DOANE,
ROBERT P. BURROWS,
ARCHIBALD F. SINCLAIR,
BY Albert G. Davis
THEIR ATTORNEY.

UNITED STATES PATENT OFFICE.

SAMUEL EVERETT DOANE, ROBERT P. BURROWS, AND ARCHIBALD F. SINCLAIR, OF CLEVELAND, OHIO, ASSIGNORS TO GENERAL ELECTRIC COMPANY, A CORPORATION OF NEW YORK.

ILLUMINATING DEVICE FOR PROJECTING PURPOSES.

14,805. Specification of Reissued Letters Patent. Reissued Feb. 17, 1920.

Original No. 1,315,821, dated September 9, 1919, Serial No. 73,442, filed January 21, 1916. Application for reissue filed October 25, 1919. Serial No. 333,881.

*To all whom it may concern:*

Be it known that we, SAMUEL E. DOANE, ROBERT P. BURROWS, and ARCHIBALD F. SINCLAIR, citizens of the United States, residing at Cleveland, Cuyahoga county, State of Ohio, have invented certain new and useful Improvements in Illuminating Devices for Projecting Purposes, of which the following is a specification.

Our invention relates to illuminating devices constituting parts of picture projection apparatus, and more particularly to housings including the supports for the light projecting elements, such as the light source, reflector and condenser, which are ordinarily included in such devices. In the specification we have used the expression "lamp housing" to indicate the apparatus comprised by our invention. Our lamp housing is particularly adapted to the use of an electric incandescent lamp as the light source. The object of our invention is to provide a device of this character which will permit of the quick replacement of lamps when necessary, and which will also permit a ready and accurate adjustment of the light projecting elements.

According to our invention, we provide within the lamp housing supports for a plurality of incandescent lamps and means whereby one lamp may be readily substituted for another in operative relation to the rest of the picture projecting apparatus. In its preferred form our invention comprises a lamp housing having at each end thereof an incandescent lamp and means for concentrating and directing the light therefrom. The parts at both ends of the lamp housing are preferably symmetrically disposed with reference to an axis passing through the center of the lamp housing, and the lamp housing is so mounted that it may be rotated upon this axis to bring the parts contained at either end thereof into accurately spaced relation with the other elements of the projection apparatus. Although it is ordinarily sufficiently effective to have the lamp housing shifted manually to secure the desired substitution of lamps, our invention also includes the use of an automatic means for shifting the lamp housing upon the failure of the lamp in immediate use. As applied to the aforesaid rotatably mounted housing, the said automatic shifting comprises means for automatically rotating the housing upon the failure of the lamp which is in immediate use and means for automatically stopping the said rotation when another lamp has been properly substituted for the lamp which has failed. Various other features and advantages of our invention will appear from the detailed description of a species and modifications thereof which follows and from a reference to the accompanying drawing.

Figure 3:
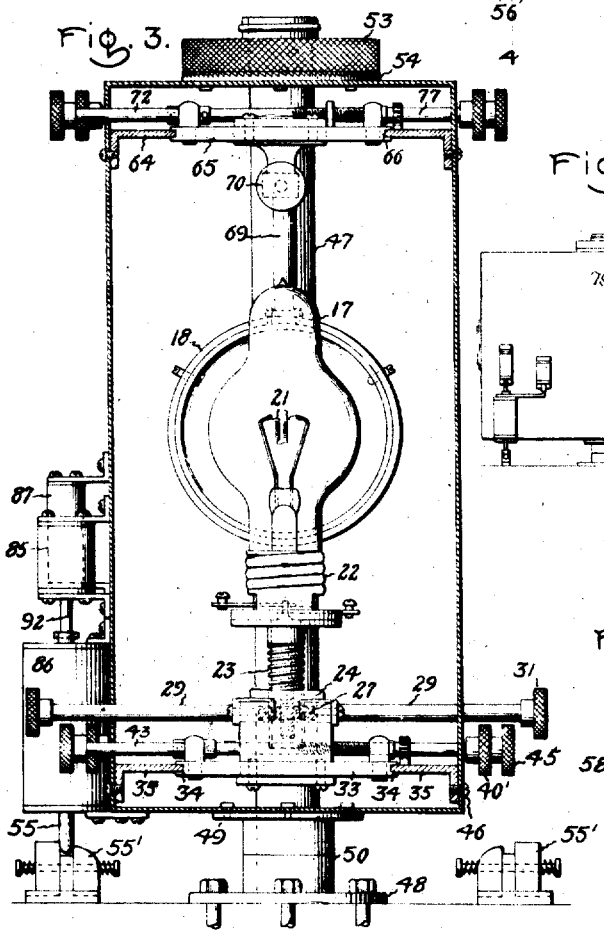
Figure 1:
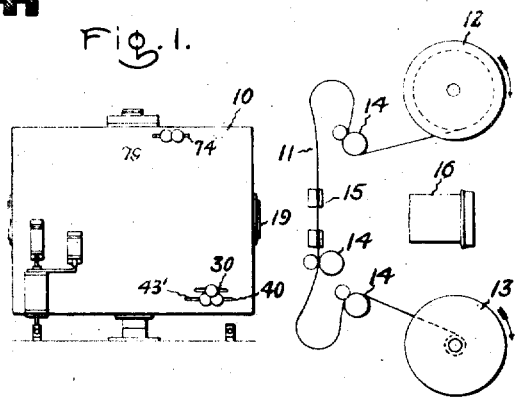
Figure 4:
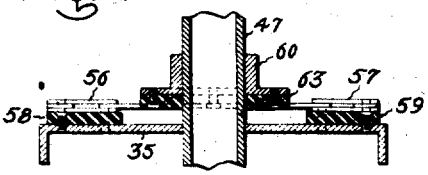
Figure 5:
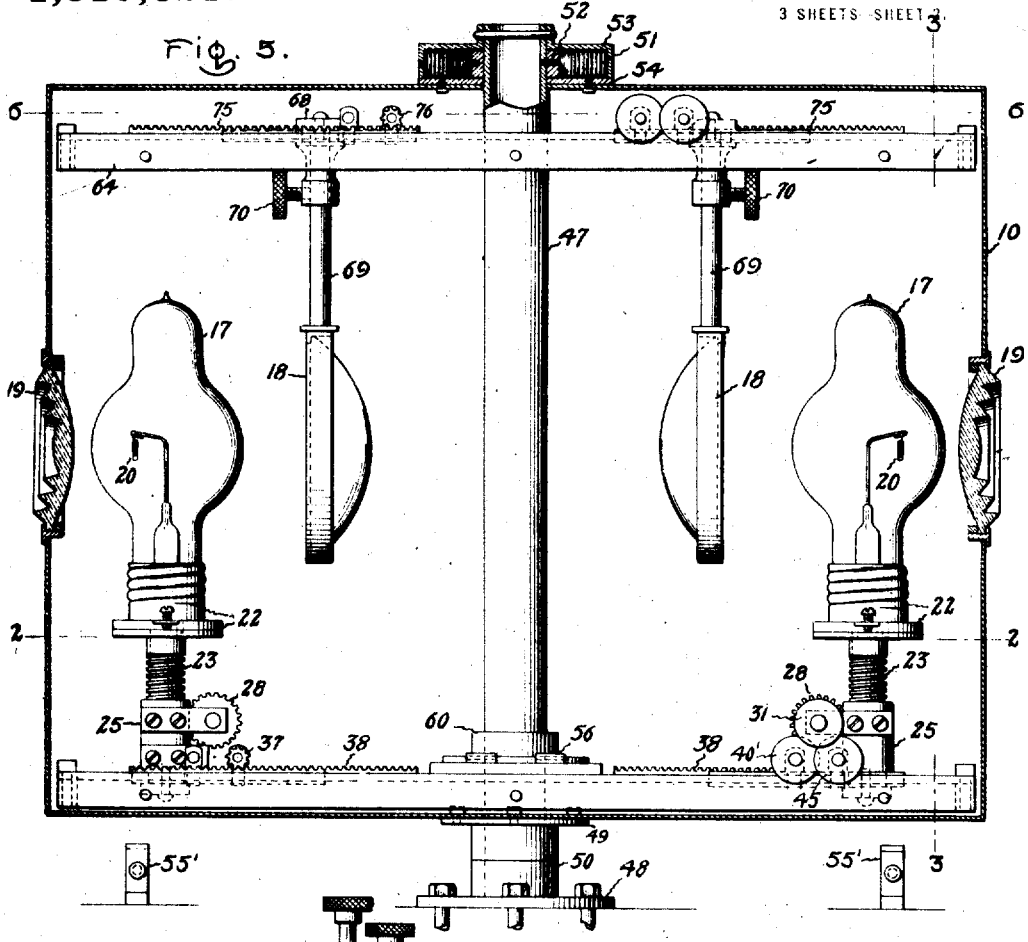
Figure 6:
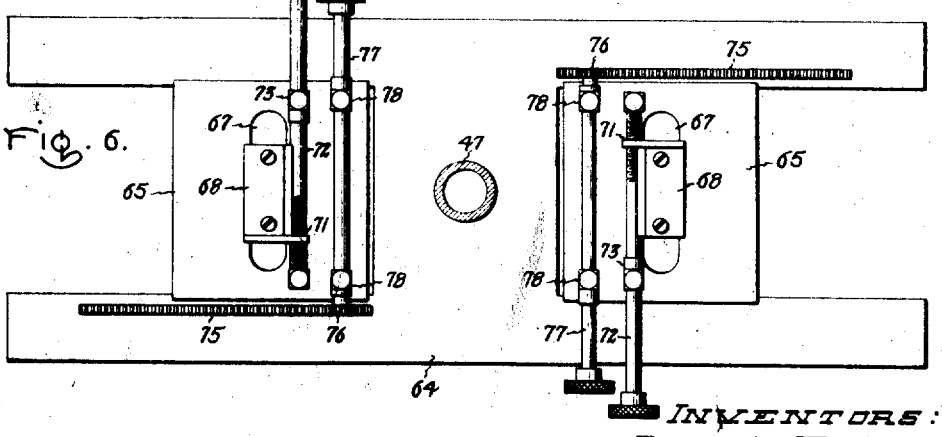
Figure 7:
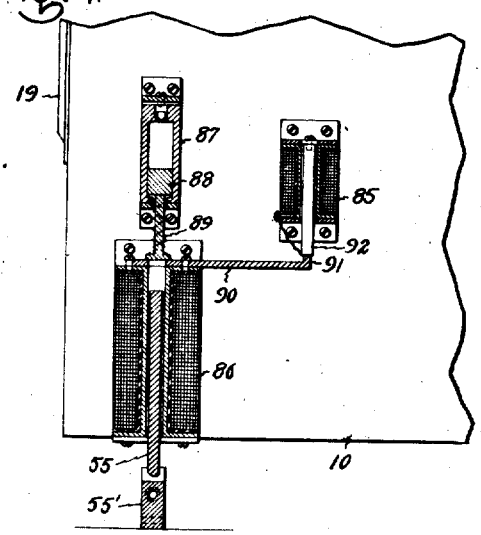
Figure 8:
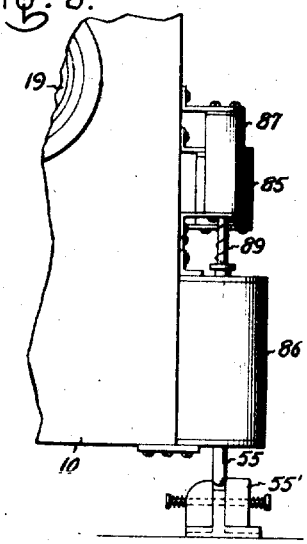
Figure 9:
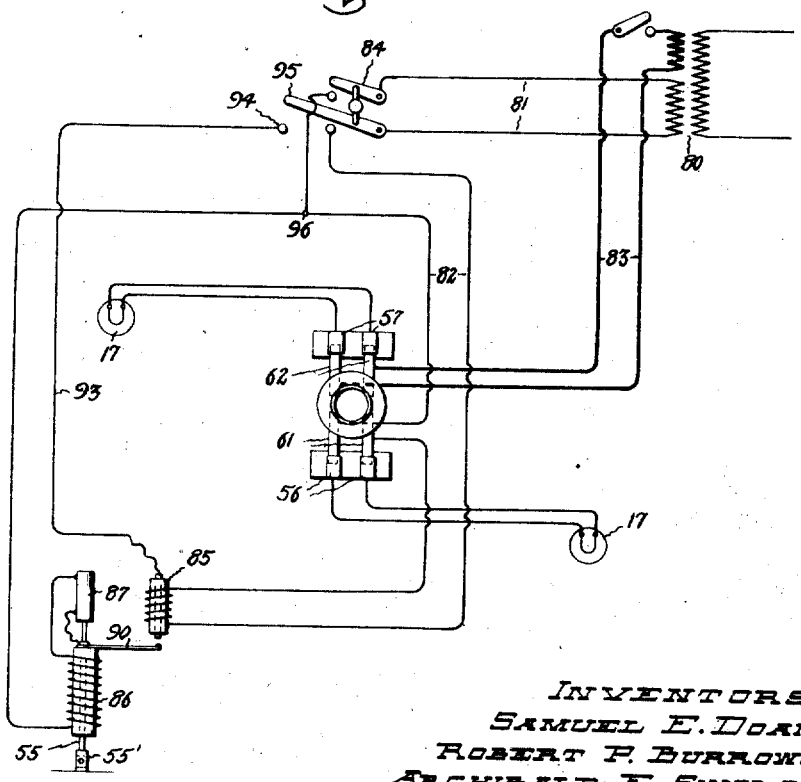

In the drawing, Figure 1 is a diagrammatic view showing in proper assembled relation the parts of a moving picture projecting apparatus. Fig. 2 is a partial horizontal section of the lamp housing showing a top plan of the lower platform and attachments forming part thereof. Fig. 3 is a transverse vertical section through the housing. Fig. 4 is a partial vertical section on the line 4—4 of Fig. 2. Fig. 5 is a longitudinal vertical section of the lamp housing. Fig. 6 is a partial horizontal section of the lamp housing showing the top plan of the upper platform and attachments. Fig. 7 is a vertical section through the mechanism for automatically rotating and stopping the lamp housing. Fig. 8 is an end elevation of the same parts. Fig. 9 is a diagram of the electric circuits comprised in the apparatus.

As shown in Fig. 1, the moving picture apparatus comprises the lamp housing 10 containing the illuminating portion of the apparatus with which our invention is concerned. The light projected from the said lamp housing is directed through the film 11, which travels from the upper reel 12 and the lower reel 13 through the idlers 14 and the aperture plate 15. After passing through the film light rays pass through the objective 16, which redirects them upon the screen (not shown). Referring now to Fig. 5 in the drawing, it will be seen that the lamp housing 10 carries at each end thereof a set of light projecting elements including the incandescent lamp 17, the reflector 18 and the condenser 19. The specific construction of these elements and their relative arrangement is disclosed in the application of John B. Taylor, Serial No. 35,768, filed June 23, 1915, which is assigned to the same assignee as is the present invention. The incandescent lamp 17 camprises the coiled filament 20, which, as shown in Fig. 3 has two parallel branches 21 lying in the same vertical plane. As disclosed in the Taylor application above referred to, the filament 20 is so disposed with relation to a horizontal axis passing through the center of the spherical reflector 18 and the condenser 19 that a real image of the said filament is reflected back to occupy a position in the same plane as the said filament but slightly offset so that the image of a branch of the coiled filament will be located between the branches 21 of the filament, and thus a practically continuous area of light source is produced.

The lamp 17 and its socket 22 are carried by a vertically disposed stud 23, which is exteriorly threaded, and the lower end of which extends within and engages with an interior thread on a bushing 24 supported by and extending within the gear-box 25, said interior thread being shown in dotted lines in Fig. 2 as 26. The portion of the bushing 24 which is within the gear-box 25 has rigidly attached thereto and circumferentially thereof a pinion 27. This is engaged by a vertically disposed pinion 28, which is mounted upon the horizontally extending rotatable rod 29, which is supported by the gear-box 25, and extends transversely of the housing through a slot 30 therein. The said rod carries at the other end thereof a knob 31. By turning the knob 31 the vertical position of the lamp 17 and of its filament 20 may be accurately adjusted. The gear-box 25, which carries the aforesaid parts, is mounted in a transversely extending slot 32 in a table 33. The latter is grooved on both sides at 34 and slidably engages the extensions of a lower platform 35 supported near the bottom of the housing. A rotatable rod 36 carries at one end a pinion 37 which engages a stationary rack 38 on an extension of the platform 35. The said rod is supported in bearings 39 on the table 33, extends through a slot 40 in the side of the housing, and has at the outer end thereof a knob 40′. It will be apparent that by rotating the knob 40′ the longitudinal position of the lamp and its filament may be accurately adjusted. The sides 41 of the gear-box 25 are perforated to engage with a thread 42 at one end of the horizontally disposed rotatable rod 43 mounted in bearings 44 on the table 33. The other end of the said rod extends through a slot 43′ and carries a knob 45. It will be apparent that by properly turning the said knob the transverse position of the lamp and its filament may be accurately adjusted. The platform 35 is secured to the casing 10, as at 46. The housing as a whole is rotatably mounted upon a centrally disposed vertical shaft 47, which is stationary, being attached to a tripod table (not shown) or similar support by a fastening 48. The housing is attached to a collar 49 loosely mounted on the said shaft and supported by stationary bearing 50. The shaft 47 extends up through the casing 10 and there is preferably provided at the top thereof a means for rotating the housing, especially when automatic means are employed for bringing such rotating means into action upon the failure of a lamp as hereinbefore described. This rotating comprises a spiral spring 51, one end of which is secured to the stationary shaft 47 at 52, and the other end to a cover plate 53 loosely mounted on said shaft. The lower edge of the member 53 is serrated, the teeth thereof engaging teeth on ratchet 54 fast to the housing. It will be apparent that the spring 51 may be wound up by turning the member 53 and that upon the release of a stop which normally holds the housing in position the said housing will be rotated. The stop used in the form equipped with the automatic attachment hereinbefore referred to is shown in Figs. 3, 7 and 8 and comprise slidable pin 55 and spring pressed slidable grips 55′.

The platform 35, as shown particularly in Figs. 2 and 4, carries at the middle portion thereof and on each side pairs of U-shaped contacts 56 and 57 suitably separated therefrom by insulations 58 and 59 respectively. The central shaft 47 has a collar 60 rigidly attached thereto which supports pairs of stationary knife-blade contacts 61 and 62, insulation 63 separating the same from the said collar. The pair of contacts 56 and 57 are each connected to a socket for one of the incandescent lamps by suitable leads (not shown). Each pair of the stationary contacts 61 and 62 is connected to the energy supply means, the connections not being shown. The electrical circuits will be described hereinafter.

Supported by the sides of the casing 10 and near the top thereof is a platform 64 which serves to support the reflector 18 and its adjustment. The said platform is similar in shape to the platform 35 and is provided at each end with extensions receiving the table 65, the sides of which are grooved at 66, and which slidably engage with the platform extension at that end. The table 65 is transversely slotted at 67. A holder 68 is slidably supported by the table in the said slot, the said holder being vertically recessed to receive the extension rod 69 attached to the reflector 18. A set screw 70 engages with the said rod, thus allowing the position of the reflector to be vertically adjusted. The portion of the holder 68 extending above the table 65 has a rearwardly extending flange 71 through which passes the threaded end of a set screw 72 rotatably supported in bearings 73 upon the said table, and extending through a slot 74 in the side of the casing. It will be apparent that by suitably turning the set screw the reflector may be transversely adjusted. A rack 75 mounted on the platform 64 extends adjacent to the table 65 and is engaged by a pinion 76 at the end of a rotatable rod 77 supported in bearing 78 on the said table. The said rod extends through a slot 79. It will be apparent that by properly turning the said rod the reflector may be longitudinally adjusted.

The electric supply circuits for the lamps 17 at each end of the housing are shown diagrammatically in Fig. 9. A transformer 80 supplies current at a comparatively high voltage through the leads 81 to the leads 82, which are connected to the stationary contacts 61 with which the movable contacts 56 connected to that lamp 17 which is in immediate use engage. The transformer 80 also furnishes current at a comparatively low voltage through leads 83 to the stationary contacts 62 with which the movable contacts 57 connected to that lamp 17 which is not in use engage. It is apparent that this portion of the supply circuit may be omitted. However, it is desirable that means be provided for lighting up that lamp 17 which is not in immediate use so that it may be properly adjusted to be ready for such use when called upon. It is not necessary that the lamp be illuminated to its fullest extent for this purpose, and, therefore, the voltage of the current supplied is preferably low. However, this is not imperative. A double contact switch 84 may be provided for cutting off the current when desired.

It will be apparent that that portion of the apparatus shown which is described above is sufficient for practical operation with or without the spring rotating device or the stop mechanism heretofore described. In such case whenever a lamp fails or it is desired to substitute another lamp for any reason, the housing may be readily rotated manually to bring the other lamp into operative relation with the rest of the picture projecting apparatus. However, in the form shown an automatic means is provided for effecting the operation upon the failure of the lamp. For this purpose there is included in series with the lamp in immediate use the winding of the solenoid 85. The winding of another solenoid 86 is connected in shunt with the supply circuit for this lamp 17. The pin 55 constitutes an armature controlled by the solenoid 86. The winding of the said solenoid is connected to the metal casing 87 of a dashpot having therein a piston 88 from which extends a contact 89 normally resting upon the contact 90, which is apertured in line with the core of the solenoid 86 and carries at its outer end a contact 91 which is in line with the armature of the solenoid 85. The armature 92 is connected by means of a lead 93 to a contact 94 which is engaged by an extension 95 of the switch 84 when the latter is in closed position. The winding of the solenoid 86 is connected at 96 to one of the leads 82.

Normally the armature 92 is held by the solenoid 85 out of engagement with the contact 91. Upon the failure of the lamp 17 in immediate use the solenoid 85 is deenergized and the armature 92 falls into engagement with the contact 91. This completes the circuit through the solenoid 86 which raises the pin 55 out of engagement with the spring holding member 55′. The spring 51 then causes the rotation of the housing until the other pin 55 engages with the holding means 55′. The other lamp is thus substituted in operative relation and the solenoid 85 is reenergized drawing up the armature 92 and breaking the circuit through the solenoid 86. The said solenoid has been previously deenergized by reason of the pin 55 striking against the contact 89 causing the piston 88 to rise in the dashpot 87. The contact 89 gradually returns into engagement with the contact 90, but the operation is so timed that by that time the circuit has been broken through the solenoid 86 and the release of the pin 55 will not be repeated.

Various changes and modifications of the above described apparatus will readily suggest themselves to those skilled in the art, but these are to be considered as coming within the scope of our invention, which is set forth in the following claims.

What we claim as new and desire to secure by Letters Patent of the United States, is:

1. In a picture projection apparatus the combination of a plurality of electric lamps adapted to be placed one after the other in operative relation with the lens system, a plurality of universally adjustable supports for said lamps whereby each lamp may be accurately and individually adjusted with reference to said lens system, means for lighting a lamp not at the time in use for focally adjusting the same, and means whereby the adjusted lamp may be substituted for the lamp in use at the will of the operator.

2. In a picture projection apparatus the combination of a plurality of electric lamps adapted to be placed one after the other in operative relation with the lens system, a plurality of universally adjustable supports for said lamps whereby each lamp may be accurately and individually adjusted with reference to said lens system, means for lighting a lamp not at the time in use for focally adjusting the same and means for automatically substituting the adjusted lamp for the lamp in use upon the failure of the latter.

3. In a picture projection apparatus the combination of a plurality of electric lamps adapted to be placed one after the other in operative relation with the lens system, a plurality of adjustable supports for said lamps whereby each lamp may be accurately and individually adjusted with reference to said lens system, means for lighting a lamp not at the time in use for focally adjusting the same, and means whereby the adjusted lamp may be substituted for the lamp in use at the will of the operator.

4. In a picture projection apparatus, the combination of a plurality of electric lamps adapted to be placed one after the other in operative relation with the lens system, a plurality of adjustable supports for said lamps whereby each lamp may be accurately and individually adjusted with reference to said lens system, means whereby each lamp may be focally adjusted prior to using the same and means whereby an adjusted lamp may be substituted for the lamp in use at the will of the operator.

5. A lamp fixture for projecting apparatus comprising a relatively fixed part, a lamp support movably mounted thereon, a plurality of lamps carried by said support and so positioned thereon that either lamp may be brought into operative position by movement of said support, means for separately adjusting said lamps relative to said support, reflectors for each of said lamps, and means for adjusting said reflectors independently of said lamps and of said support.

6. A lamp fixture for projecting purposes comprising a table mounted for rotation, incandescent lamps carried by said table at different points circumferentially thereof, each of said lamps being mounted on a part having a radially adjustable connection with said table, and means for separately adjusting said lamp carrying parts.

7. A lamp for projecting apparatus comprising a rotatable table, radially adjustable slides carried by said table at diametrically opposite points, a second slide carried by each of said first mentioned slides and adjustable transversely thereof, and incandescent electric lamps carried by said second slides.

8. A lamp for projecting purposes comprising a table mounted for rotation, a plurality of lamps supported by said table to be brought by rotation thereof to the same operative position, and means for separately adjusting said lamps both circumferentially and radially of said table.

9. A lamp for projecting apparatus comprising a table mounted for rotation, a plurality of lamps supported by said table to be brought by rotation thereof to the same operative position, means for separately adjusting said lamps both circumferentially and radially of said table, and separate reflectors for each of said lamps, said reflectors being adjustably supported independently of their respective lamps.

10. A lamp for projecting apparatus comprising a rotatably mounted table, a plurality of lamps supported by the table for adjustment by rotation of the table to the same operative position, said table comprising a lower lamp-supporting part, an upper part rigidly connected to said lamp-supporting part and extending above said lamps, and separate reflectors for each of said lamps suspended from said upper part.

11. A lamp for projecting apparatus comprising a rotatable table, a plurality of lamps supported by the table for adjustment by rotation of the table to the same operative position, said table comprising a lower lamp-supporting part, an upper part rigidly connected to said lamp-supporting part and extending above said lamps, separate reflectors for each of said lamps suspended from said upper part, adjustable connections between said lamps and said table, and separate adjustable connections between said reflectors and said table.

In witness whereof we have hereunto set our hands this 17th day of January, 1916.

SAMUEL EVERETT DOANE.
ROBERT P. BURROWS.
ARCHIBALD F. SINCLAIR.